（12) United States Patent
Hu et al.

(10) Patent No.: US 10,492,209 B2
(45) Date of Patent: Nov. 26, 2019

(54) CONTROL INFORMATION SENDING OR RECEIVING METHOD, APPARATUS, AND SYSTEM

(71) Applicant: HUAWEI TECHNOLOGIES CO., LTD., Shenzhen (CN)

(72) Inventors: Xingxing Hu, Shanghai (CN); Tianle Deng, Shanghai (CN); Kaijie Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/921,655

(22) Filed: Mar. 15, 2018

(65) Prior Publication Data
US 2018/0206249 A1    Jul. 19, 2018

Related U.S. Application Data

(63) Continuation of application No. PCT/CN2015/089631, filed on Sep. 15, 2015.

(51) Int. Cl.
H04W 72/04    (2009.01)
H04W 72/12    (2009.01)

(52) U.S. Cl.
CPC ......... H04W 72/12 (2013.01); H04W 72/042 (2013.01)

(58) Field of Classification Search
CPC .... H04W 72/12; H04W 72/04; H04W 72/042
See application file for complete search history.

(56) References Cited

U.S. PATENT DOCUMENTS

| 2011/0177821 | A1 | 7/2011 | Senarath et al. | |
|---|---|---|---|---|
| 2012/0322445 | A1* | 12/2012 | Kwon | H04W 52/04 455/436 |
| 2013/0089051 | A1 | 4/2013 | Bai et al. | |
| 2013/0279462 | A1* | 10/2013 | He | H04W 72/042 370/329 |
| 2014/0201897 | A1* | 7/2014 | DiMaio | A47K 11/12 4/479 |
| 2014/0321401 | A1 | 10/2014 | Zhang et al. | |

(Continued)

FOREIGN PATENT DOCUMENTS

CN    101409582 A    4/2009
CN    101998703 A    3/2011
(Continued)

Primary Examiner — Chi Ho A Lee
(74) Attorney, Agent, or Firm — Kilpatrick Townsend & Stockton LLP

(57) ABSTRACT

An embodiment of the present application discloses a control information sending method. The method includes: determining, by a base station, a first resource on a first network, where the first resource is located in a first scheduling resource time granularity of the first network; and sending, by the base station, downlink control information of a second network to a terminal on the first resource, where the downlink control information sent on the first resource is used to schedule a resource in a first scheduling resource time granularity of the second network, and a length of a scheduling resource time granularity of the first network is different from a length of a scheduling resource time granularity of the second network. According to the method, control information of the second network can be transmitted reliably.

12 Claims, 6 Drawing Sheets

401
A base station determines a first resource on a first network, where the first resource is located in a first scheduling resource time granularity of the first network 402
The base station sends downlink control information of a second network to a terminal on the first resource

(56) References Cited

U.S. PATENT DOCUMENTS

| | | | |
|---|---|---|---|
| 2014/0376422 A1* | 12/2014 | Dai | H04W 72/042 |
| | | | 370/280 |
| 2015/0043396 A1* | 2/2015 | Ekpenyong | H04L 5/1469 |
| | | | 370/280 |
| 2016/0295624 A1* | 10/2016 | Novlan | H04W 76/14 |
| 2016/0366672 A1* | 12/2016 | Papasakellariou | H04W 72/042 |
| 2017/0019886 A1* | 1/2017 | Patel | H04W 4/70 |
| 2017/0230959 A1* | 8/2017 | Wu | H04W 72/02 |
| 2017/0318565 A1* | 11/2017 | Golitschek Edler von Elbwart | H04W 72/042 |
| 2017/0318582 A1 | 11/2017 | Au et al. | |
| 2018/0176934 A1* | 6/2018 | Uchino | H04W 72/085 |
| 2018/0219666 A1 | 8/2018 | Lee et al. | |
| 2018/0227885 A1* | 8/2018 | Lee | H04J 11/00 |
| 2018/0234956 A1* | 8/2018 | Seo | H04J 11/0056 |

FOREIGN PATENT DOCUMENTS

| | | | |
|---|---|---|---|
| CN | 102264131 A | 11/2011 | |
| CN | 102447538 A | 5/2012 | |
| CN | 102598824 A | 7/2012 | |
| CN | 102695177 A | 9/2012 | |
| CN | 103209493 A | 7/2013 | |
| CN | 104521281 A | 4/2015 | |
| CN | 104620629 A | 5/2015 | |
| CN | 106797248 A | 5/2017 | |
| EP | 2816858 A1 | 12/2014 | |
| WO | 2013077785 A1 | 5/2013 | |
| WO | 2014038863 A1 | 3/2014 | |
| WO | 2016064049 A1 | 4/2016 | |

* cited by examiner

CONTROL INFORMATION SENDING OR RECEIVING METHOD, APPARATUS, AND SYSTEM

CROSS-REFERENCE TO RELATED APPLICATIONS

This application is a continuation of International Application No. PCT/CN2015/089631, filed on Sep. 15, 2015, the disclosure of which is hereby incorporated by reference in its entirety.

TECHNICAL FIELD

The present application relates to wireless communications technologies, and in particular, to a control information sending or receiving method, an apparatus, and a system.

BACKGROUND

With the development of global wireless communications technologies, a new-generation network gradually steps into people's life. In addition, existing networks will still provide some services for terminals. Therefore, in the future, coexistence of a plurality of types of networks is an inevitable trend. A scheduling resource time granularity, such as a transmission time interval (TTI), defined for the new-generation network may be different from that defined for an existing network. For example, to reduce a transmission latency, the scheduling resource time granularity defined for the new-generation network is shorter than that defined for the existing network.

Information cannot be securely and reliably transmitted on a network due to a factor such as network overload or external interference caused to a transmission environment. This results in a severe consequence when the information is control information.

SUMMARY

The present application provides a control information sending method, an apparatus, and a system, to ensure reliable transmission of control information on a network.

According to a first aspect, an embodiment of the present application provides a control information sending method. The method includes: determining, by a base station, a first resource in a first network, where the first resource is located in a first scheduling resource time granularity of the first network; and sending, by the base station, downlink control information regarding a second network to a terminal on the first resource, where the downlink control information sent on the first resource is used to schedule a resource in a first scheduling resource time granularity of the second network, and a length of a scheduling resource time granularity of the first network is different from a length of a scheduling resource time granularity of the second network.

According to a second aspect, an embodiment of the present application provides a control information receiving method. The method includes: determining, by a terminal, a location of a first resource in a first network, where the first resource is located in a first scheduling resource time granularity of the first network; and receiving, by the terminal, downlink control information regarding a second network that is sent to the terminal by a base station on the first resource, where the downlink control information sent on the first resource is used to schedule a resource in a first scheduling resource time granularity of the second network, and a length of a scheduling resource time granularity of the first network is different from a length of a scheduling resource time granularity of the second network.

According to the technical solutions provided in the embodiments of the present application, the base station determines a resource in the first network, and sends control information of the second network on the resource, so that scheduling is implemented across two networks with different scheduling resource time granularities. Therefore, control information can be transmitted when the second network encounters a problem such as overload or low reliability of communication, thereby ensuring that the control information of the second network can be accurately transmitted to user equipment.

In an implementation of the first aspect or the second aspect of the embodiments of the present application, the first scheduling resource time granularity of the first network includes a plurality of first resources, and the plurality of first resources are grouped into a first resource set.

Because the length of the scheduling resource time granularity of the first network is different from the length of the scheduling resource time granularity of the second network, scheduling efficiency is improved when the scheduling resource time granularity of the first network includes a plurality of first resources.

In an implementation of the first aspect or the second aspect of the embodiments of the present application, before the sending, by the base station, downlink control information regarding a second network to a terminal on the first resource, the method further includes: sending, by the base station, configuration information to the terminal, where the configuration information is used to indicate a location of the first resource set to the terminal.

According to this step of the method, the terminal can learn of the location of the first resource set on the first network, so that the terminal obtains the downlink control information of the second network from the first network.

In an implementation of the first aspect or the second aspect of the embodiments of the present application, the configuration information includes at least one of time-domain location indication information of the first resource set and frequency-domain location indication information of the first resource set.

The base station may send the configuration information to the terminal by using a control channel, broadcast signaling, or radio resource control RRC signaling.

In an implementation of the first aspect or the second aspect of the embodiments of the present application, the length of the scheduling resource time granularity of the first network is N times the length of the scheduling resource time granularity of the second network, and the first scheduling resource time granularity of the first network includes N first resources, where N is a positive integer greater than 1.

In this case, the N first resources are consecutive in a time domain.

In an implementation of the first aspect or the second aspect of the embodiments of the present application, the downlink control information is downlink grant information; and in the time domain, the downlink grant information carried on the first resource is sent to the terminal by the base station before or at the same time as the first scheduling resource time granularity of the second network, where the first scheduling resource time granularity of the second network is scheduled by using the downlink grant information, and the first scheduling resource time granularity of the second network carries downlink data scheduled by using the downlink grant information.

In an implementation of the first aspect or the second aspect of the embodiments of the present application, the downlink control information is uplink grant information; and in the time domain, the uplink grant information carried on the first resource is sent to the terminal by the base station before or at the same time as the first scheduling resource time granularity of the second network, where the first scheduling resource time granularity of the second network is scheduled by using the uplink grant information, and the first scheduling resource time granularity of the second network carries uplink data scheduled by using the uplink grant information.

In an implementation of the first aspect or the second aspect of the embodiments of the present application, the method further includes: determining, by the base station, a second resource in the first network, where the second resource is located in a second scheduling resource time granularity of the first network; and receiving, by the base station on the second resource, uplink control information of the second network that is sent by the terminal, where the uplink control information sent on the second resource is used to indicate information about a resource in a second scheduling resource time granularity of the second network.

The terminal may further send the uplink control information of the second network on the second resource, so that scheduling is implemented across two networks with different scheduling resource time granularities. Therefore, control information can be transmitted when the second network encounters a problem such as overload or low reliability of communication, thereby ensuring that the control information of the second network can be accurately transmitted to user equipment.

In an implementation of the first aspect or the second aspect of the embodiments of the present application, a channel onto which the first resource is mapped and a physical downlink shared channel PDSCH of the first network are frequency-division multiplexed.

In an implementation of the first aspect or the second aspect of the embodiments of the present application, frequency-division multiplexing is implemented on a channel mapped onto the second resource and a physical uplink shared channel PUSCH of the first network.

The PDSCH or PUSCH of the first network is a channel used to transmit data of the first network and has a large capacity; therefore, channel utilization of the first network can be improved if the frequency-division multiplexing is implemented on the channel mapped onto the first resource and the PDSCH, or the frequency-division multiplexing is implemented on the channel mapped onto the second resource and the PUSCH.

An application scenario of the foregoing first aspect or second aspect may be: the length of the scheduling resource time granularity of the first network is greater than the length of the scheduling resource time granularity of the second network; and a frequency band used for the first network is less than a frequency band used for the second network.

In this case, the second network belongs to a future new network, and the length of the scheduling resource time granularity of the second network may be designed to be very short to satisfy low-latency transmission. In addition, a high-frequency band may be used by a second base station belonging to a future new network due to a lack of low-frequency resources. However, information is likely to be lost because quality of a transmission environment for a high-frequency band channel is relatively poor. In this case, according to the technical solutions of the present application, a high loss rate of the control information transmitted on the second network is well reduced.

According to a third aspect, an embodiment of the present application provides a base station, where the base station includes: a processing unit, configured to determine a first resource in a first network, where the first resource is located in a first scheduling resource time granularity of the first network; and a transceiver unit, configured to send downlink control information regarding a second network to a terminal on the first resource, where the downlink control information sent on the first resource is used to schedule a resource in a first scheduling resource time granularity of the second network, and a length of a scheduling resource time granularity of the first network is different from a length of a scheduling resource time granularity of the second network.

According to a fourth aspect, an embodiment of the present application provides a terminal in a first network, where the terminal includes: a processing unit, configured to determine a location of a first resource in the first network, where the first resource is located in a first scheduling resource time granularity of the first network; and a transceiver unit, configured to receive downlink control information regarding a second network that is sent to the terminal by a base station on the first resource, where the downlink control information sent on the first resource is used to schedule a resource in a first scheduling resource time granularity of the second network, and a length of a scheduling resource time granularity of the first network is different from a length of a scheduling resource time granularity of the second network.

According to the technical solutions provided in the embodiments of the present application, the base station determines a resource on the first network, and sends control information of the second network on the resource, so that scheduling is implemented across two networks with different scheduling resource time granularities. Therefore, control information can be transmitted when the second network encounters a problem such as overload or low reliability of communication, thereby ensuring that the control information of the second network can be accurately transmitted to user equipment.

The base station provided in the third aspect of the embodiments of the present application and the terminal provided in the fourth aspect of the embodiments of the present application can implement the method of any one of the implementations of the first aspect and the second aspect of the embodiments of the present application, and details are not described herein again.

According to a fifth aspect, an embodiment of the present application further provides a communications system, where the communications system may include the foregoing terminal and base station.

According to a sixth aspect, an embodiment of the present application further provides a computer program which may be used to instruct a computer to execute the methods provided in the first aspect and the second aspect and in the implementations of the first aspect and the second aspect.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and persons of ordinary skill in the art may still derive other drawings from these accompanying drawings without creative efforts.

DESCRIPTION OF EMBODIMENTS

Figure 1A:
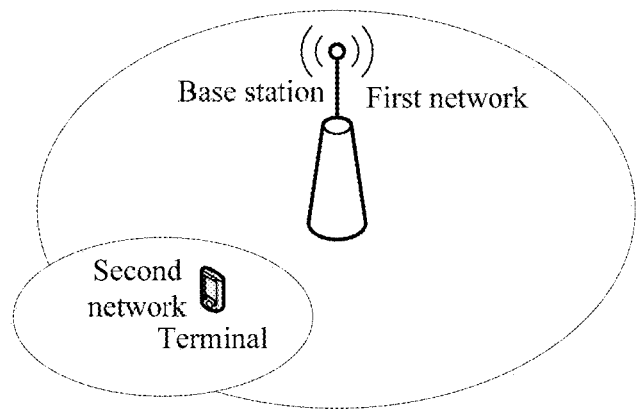
FIG. 1(a) is a schematic diagram of a communications system according to an embodiment of the present application.

To make the application objectives and specific technical solutions of the present application clearer, the following further clearly describes the technical solutions with reference to the accompanying drawings and specific implementations. Apparently, the described implementations are merely some rather than all of the embodiments of the present application. All other embodiments obtained by persons of ordinary skill in the art based on the embodiments of the present application without creative efforts shall fall within the protection scope of the present application.

An application scenario embodiment of the embodiments of the present application is: there are at least two types of networks in a communications system, namely, a first network and a second network, and the two types of networks have different scheduling resource time granularities. The scheduling resource time granularity may also be referred to as a resource scheduling unit or a minim scheduling unit (MSU) and is a transmission channel dimension that represents a minimum data transmission time. Specifically, the scheduling resource time granularity refers to a length of a transmission block that can be independently demodulated on a radio link, for example, a transmission time interval (TTI) on a Long Term Evolution (ILTE) network. A coverage area of the first network and a coverage area of the second network are overlapped. A first radio access technology (RAT) supported by the first network and a second RAT supported by the second network may be the same or may be different, but the first network and the second network are in different carrier ranges. In addition, one base station may provide a service for both the first network and the second network, or a first base station provides a service for the first network and a second base station provides a service for the second network.

Optionally, the aforementioned first base station may be a macro base station, and the second base station may be a small cell. Both a transmit power and a coverage area of the small cell are less than those of the macro base station, for example, the small cell may be a home evolved NodeB (HeNodeB), a micro base station, an access point (AP), or a pico base station.

Optionally, the first network or the second network may be specifically a Code Division Multiple Access (CDMA) network, a Time Division Multiple Access (TDMA) network, a Frequency Division Multiple Access (FDMA) network, an Orthogonal Frequency-Division Multiple Access (OFDMA) network, or a Single Carrier Frequency-Division Multiple Access (SC-FDMA) network, or another network. Terms "network" and "system" may be replaced with others. Wireless technologies such as the Universal Terrestrial Radio Access (UTRA) and CDMA2000, may be implemented on the CDMA network. UTRA may include CDMA (WCDMA) and other variations of CDMA. CDMA2000 may cover the Interim Standard (IS) 2000 (IS-2000), the IS-95 standard, and the IS-856. Wireless technologies, such as the Global System for Mobile Communications (GSM), may be implemented on the TDMA network. Wireless technologies, such as the Evolved Universal Terrestrial Radio Access (E-UTRA), the Ultra Mobile Broadband (UMB), IEEE 802.11 (Wi-Fi), IEEE 802.16 (WiMAX), IEEE 802.20, and Flash OFDMA, may be implemented on the OFDMA network. UTRA and E-UTRA are UMTS and evolved-edition of UMTS. A new-edition UMTS to which E-UTRA is applied is used in LTE and LTE advanced (LTE-A) defined in 3GPP. UTRA, E-UTRA, UMTS, LTE, LTE-A, and GSM are described and recorded in documents of the 3GPP standardization organization. CDMA2000 and UMB are described and recorded in documents of the 3GPP2 standardization organization. The first network or the second network may also be a new-generation network such as the fifth generation (5G) network.

Further, there is a terminal in the communications system. The terminal may be in both the coverage area of the first network and the coverage area of the second network, that is, both the first network and the second network can provide a service for the terminal. The terminal may also be referred to as user equipment (UE), a mobile station, a subscriber unit, a cellular phone, a smartphone (smart phone), a wireless data card, a personal digital assistant (PDA) computer, a tablet, a wireless modem, a handheld device, a laptop computer, a cordless phone, a wireless local loop (WLL) station, or the like.

Figure 1B:
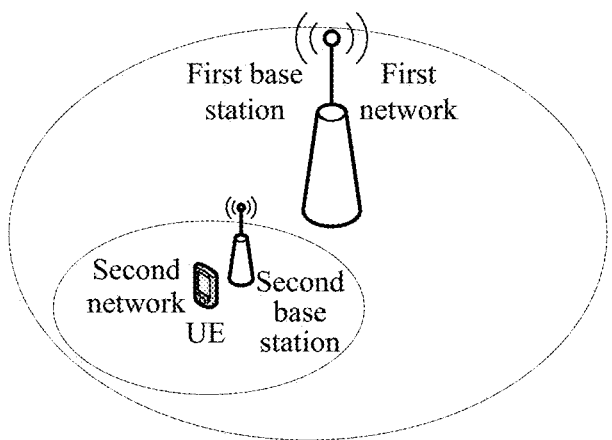
FIG. 1(b) is a schematic diagram of another communications system according to an embodiment of the present application.

For example, as shown in FIG. 1(a), FIG. 1(a) is a diagram of an application scenario in which a coverage area of a first network and a coverage area of a second network are overlapped, the first network and the second network are controlled by a same base station, and a terminal is on an overlapped part of the coverage area of the first network and the coverage area of the second network; as shown in FIG. 1(b), FIG. 1(b) is a diagram of an application scenario in which a coverage area of a first network and a coverage area of a second network are overlapped, a first base station provides a service for the first network, a second base station provides a service for the second network, the first base station is a macro base station, the second base station is a small cell, and a terminal is on an overlapped part of the coverage area of the first network and the coverage area of the second network.

Because problems, such as information transmission overload and transmission reliability decrease, occur on the second network, control information of the second network needs to be transmitted with help from the first network, so as to perform resource scheduling on the second network for the terminal.

For example, the following scenario may be considered: to meet an increasingly harsher demand for low-latency transmission of a communications system, a scheduling resource time granularity is designed to be shorter on a new-generation network or some existing networks. For example, a scheduling resource time granularity (that is, TTI) on a current LTE network is 1 ms, but in the further, a scheduling resource time granularity may be designed to be less than 1 ms, for example 0.1 ms. If this form of scheduling resource time granularity is applied to a new-generation network on which a high-frequency band is used for communication, a transmission latency of the communications system can surely be reduced. However, high-frequency communication is prone to be affected by a transmission environment; as a result, using a high-frequency band for communication may lead to loss of information that is being transmitted. To resolve the foregoing problem, a feasible method is that control information of a network on which a high frequency is used for communication is transmitted on a network on which a low frequency is used for communication.

In the prior art, an LTE network has been capable of implementing carrier aggregation and cross-carrier scheduling methods to make full use of channel resources of two carriers. For example, scheduling for a terminal in a primary component carrier cell and a secondary component carrier cell is implemented in a physical downlink common control channel (PDCCCH) or an enhanced physical downlink common control channel (EPDCCCH) manner. However, currently, scheduling is still performed on a same network no matter in the PDCCCH manner or the EPDCCCH manner. What is more important is: a prerequisite for implementing cross-carrier scheduling in these two manners is that lengths of TTIs corresponding to the two types of carriers have to be the same.

According to the solutions provided in the embodiments of the present application, control information of a network on which a high frequency is used for communication can be transmitted on a network on which a low frequency is used for communication, so that cross-network resource scheduling can be implemented on different networks on which different scheduling resource time granularities are used.

Figure 2:
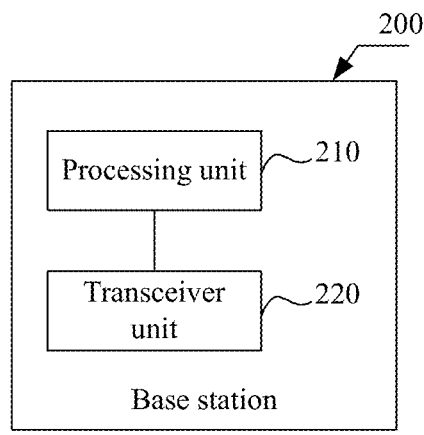
FIG. 2 is a schematic structural diagram of a base station according to an embodiment of the present application.
Figure 3:
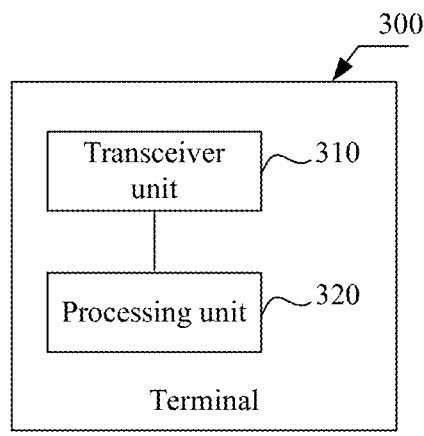
FIG. 3 is a schematic structural diagram of a terminal according to an embodiment of the present application.

To resolve the foregoing problem, an embodiment of the present application provides a base station 200. The base station 200 may be the base station that provides a service for the first network and the second network or may be the first base station that provides a service only for the first network in the application scenario embodiment. As shown in FIG. 2, the base station 200 includes a processing unit 210 and a transceiver unit 220. An embodiment of the present application further provides a terminal 300. The terminal 300 may be the terminal in the application scenario embodiment. As shown in FIG. 3, the terminal 300 includes a transceiver unit 310 and a processing unit 320. In this embodiment of the present application, the processing unit 210 and the transceiver unit 220 are included in the base station 200, and the processing unit 320 and the transceiver unit 310 are included in the terminal 300. Therefore, an operation performed by the processing unit 210 or the transceiver unit 220 may be regarded as an operation of the base station 200, and an operation performed by the processing unit 320 or the transceiver unit 310 may be regarded as an operation of the terminal 300. In this embodiment of the present application, the processing unit 210 in the base station 200 may be implemented by a processor in the base station 200, and the transceiver unit 220 may be implemented by a transceiver in the base station 200; the processing unit 320 in the terminal 300 may be implemented by a processor in the terminal 300, and the transceiver unit 310 may be implemented by a transceiver in the terminal 300.

Figure 4:
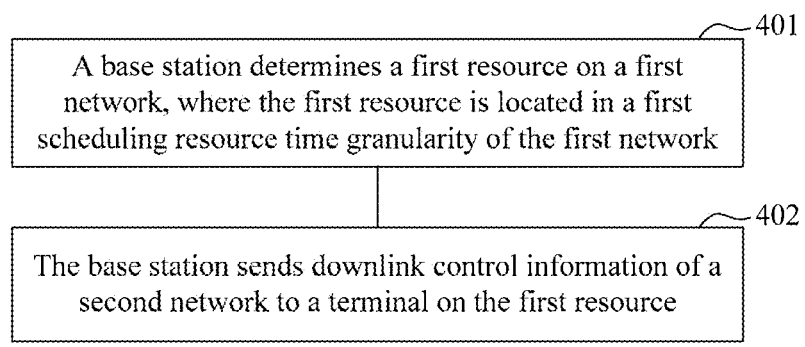
FIG. 4 is a flowchart of a control information sending method according to an embodiment of the present application.

FIG. 4 is a flowchart of a control information sending method according to an embodiment of the present application. The method may be applied to the application scenario embodiment of the present application, and is implemented cooperatively by the base station 200 in the embodiment of the present application in FIG. 2 and the terminal 300 in the embodiment of the present application in FIG. 3. The method includes the following steps.

S401. The base station 200 determines a first resource in a first network, where the first resource is located in a first scheduling resource time granularity of the first network.

To transmit control information of a second network on the first network, the base station 200 needs to determine a suitable first resource on the first network to transmit the control information. The first resource may also be referred to as a cross-carrier scheduling resource. In addition, a determining manner in S401 may be that the base station 200 obtains configuration information of the first resource on the first network, or may be that the base station 200 allocates configuration information of the first resource on the first network by itself. This is not limited herein.

Optionally, the first resource includes a downlink resource. When the first resource on the first network includes a downlink resource, frequency-division multiplexing may be implemented on a channel mapped onto the first resource and a physical downlink shared channel (PDSCH) of the first network. For example, the first resource on the first network is mapped onto an EPDCCCH. The PDSCH of the first network is a channel used to transmit data of the first network and has a large capacity. Therefore, channel utilization of the first network can be improved if the frequency-division multiplexing is implemented on the channel mapped onto the first resource and the PDSCH.

Optionally, a processing unit 210 of the base station 200 is configured to determine the first resource on the first network, where the first resource is located in the first scheduling resource time granularity of the first network.

S402. The base station 200 sends downlink control information regarding a second network to the terminal 300 on the first resource.

The downlink control information sent on the first resource is used to schedule a resource in a first scheduling resource time granularity of the second network, and a length of a scheduling resource time granularity of the first network is different from a length of a scheduling resource time granularity of the second network.

To achieve an objective of scheduling data of the second network on the first network, the base station 200 sends the downlink control information of the second network to the terminal 300 on the first resource of the first network.

If the base station 200 is a base station that provides a service for the first network and the second network, the base station 200 can learn of the downlink control information of the second network by itself; if the base station 200 is a first base station that can provide a service only for the first network, the base station 200 may obtain the downlink control information of the second network in the following manner: the base station 200 receives the downlink control information sent by a second base station that provides a service for the second network, so as to send the downlink control information to the terminal 300 by using the first resource.

Optionally, the downlink control information sent to the terminal 300 by the base station 200 is downlink grant information.

The downlink grant information may include information about resources (including time-domain, frequency-domain, and space-domain resources, and the like) corresponding to downlink scheduling data that is of the terminal 300 and that is on the second network. The information about the resources corresponding to the downlink scheduling data may include: a frequency-domain location, a time-domain location, or a space-domain location. The downlink grant information may further include: identifier information of the terminal 300 (used to make the terminal 300 know whether the scheduling grant information is information belonging to the terminal 300), a modulation and coding scheme (indicating a modulation manner and a coding manner that are used for transmitting data by the terminal 300), a redundancy version, a new data indicator (indicating whether a current block is new data or retransmitted data), a transmission block size, hybrid automatic repeat request (HARQ) information (indicating a current HARQ process number), and the like. In this case, in a time domain, the downlink grant information carried on the first resource is sent to the terminal 300 by the base station 200 before or at the same time as the first scheduling resource time granularity of the second network, where the first scheduling resource time granularity of the second network is scheduled by using the downlink grant information, and the first scheduling resource time granularity of the second network carries downlink data scheduled by using the downlink grant information.

Certainly, in an exception, a current network has already been capable of sending downlink grant information a little later than downlink data; therefore, in rare special cases, the downlink grant information may be sent a little later than the downlink data in the first scheduling resource time granularity of the second network.

The downlink control information sent to the terminal 300 by the base station 200 may alternatively be uplink grant information. The uplink grant information may include information about resources (including time-domain, frequency-domain, and space-domain resources, and the like) corresponding to uplink scheduling data that is of the terminal 300 and that is on the second network. The information about the resources corresponding to the uplink scheduling data may include: a frequency-domain location, a time-domain location, or a space-domain location. The uplink grant information may further include: identifier information of the terminal 300 (used to make the terminal 300 know whether the scheduling grant information is information belonging to the terminal 300), a modulation and coding scheme (indicating a modulation manner and a coding manner that are used for transmitting data by the terminal 300), a redundancy version, a new data indicator (indicating whether a current block is new data or retransmitted data), a transmission block size, HARQ information (indicating a current HARQ process number), and the like. In this case, in a time domain, the uplink grant information carried on the first resource is sent to the terminal by the base station before or at the same time as the first scheduling resource time granularity of the second network, where the first scheduling resource time granularity of the second network is scheduled by using the uplink grant information, and the first scheduling resource time granularity of the second network carries uplink data scheduled by using the uplink grant information.

Certainly, the downlink control information sent to the terminal 300 by the base station 200 may alternatively be a downlink acknowledgement (ACK), or a downlink negative acknowledgement (NACK). In this case, in a time domain, the downlink ACK or downlink NACK carried on the first resource is sent to the terminal 300 by the base station 200 after the first scheduling resource time granularity of the second network, where the first scheduling resource time granularity of the second network is scheduled by using the downlink ACK or downlink NACK and before the terminal 300 uploads uplink data that has a same hybrid automatic repeat request identity (HARQ ID) as the first scheduling resource time granularity of the second network. The first scheduling resource time granularity of the second network carries uplink data to be responded by the downlink ACK or the downlink NACK.

Optionally, when one piece of downlink control information is sent on the first resource, one scheduling resource time granularity of the second network is scheduled by using the downlink control information. In this case, the first resource corresponds to one scheduling resource time granularity of the second network.

When M pieces of downlink control information are sent on the first resource, M scheduling resource time granularities of the second network are scheduled by using the downlink control information, where M is a positive integer greater than 1. Each piece of downlink control information is used to schedule one scheduling resource time granularity of the second network. In this case, the first resource corresponds to M scheduling resource time granularities of the second network.

Optionally, the first scheduling resource time granularity of the first network includes a plurality of first resources, and the plurality of first resources are grouped into a first resource set.

When the length of the scheduling resource time granularity of the first network is N times the length of the scheduling resource time granularity of the second network, the first scheduling resource time granularity of the first network may include N first resources. N is a positive integer greater than 1.

For easy implementation performed by persons skilled in the art, the following provides several more specific embodiments.

Figure 5:
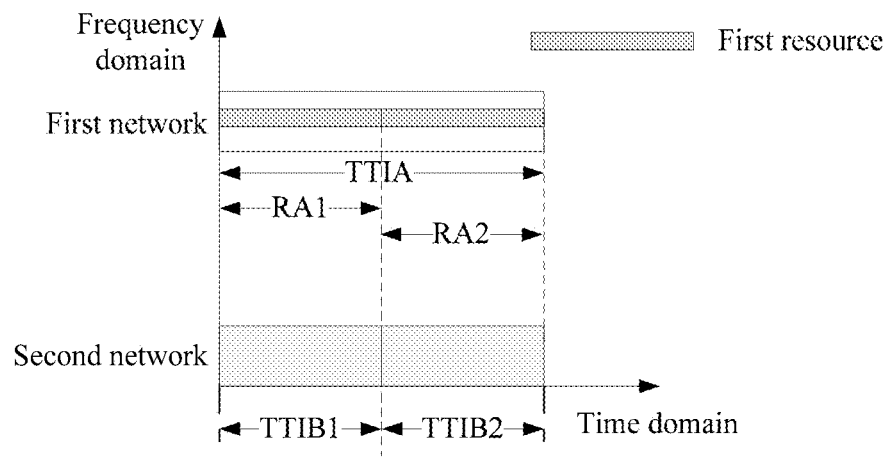
FIG. 5 is a schematic diagram of resource division according to an embodiment of the present application.
Figure 5A:
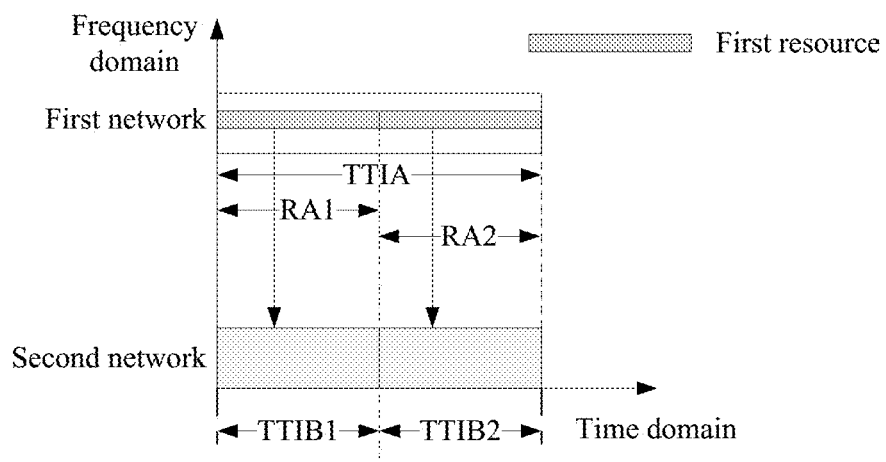
FIG. 5(a) is a schematic diagram of resource scheduling according to an embodiment of the present application.
Figure 5B:
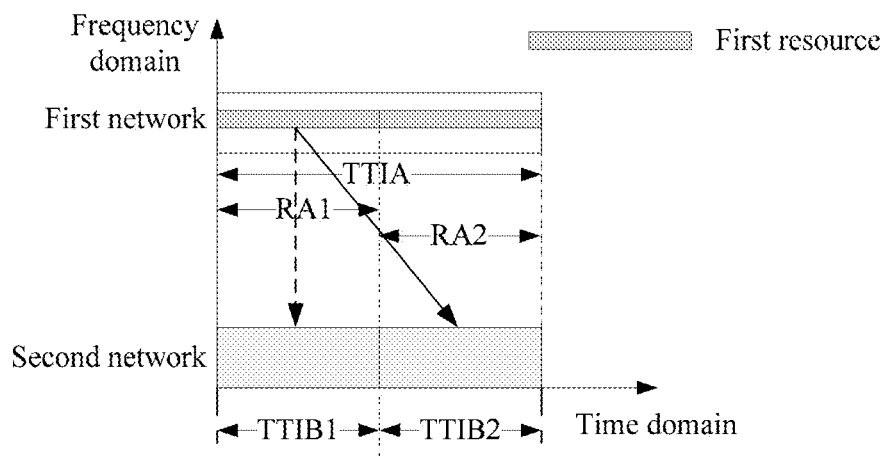
FIG. 5(b) is a schematic diagram of another type of resource scheduling according to an embodiment of the present application.
Figure 5C:
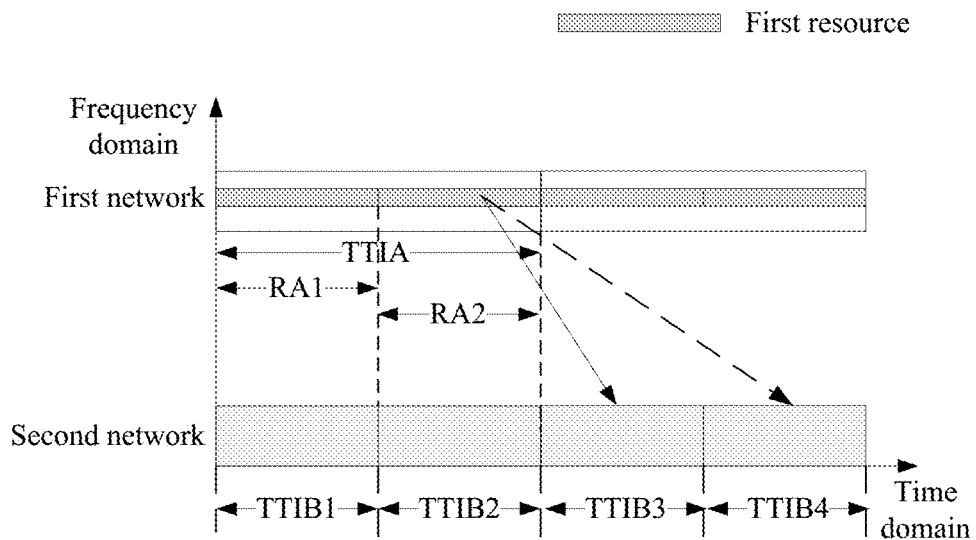
FIG. 5(c) is a schematic diagram of still another type of resource scheduling according to an embodiment of the present application.

FIG. 5 is a schematic diagram of resource scheduling according to the present application. As shown in FIG. 5, both a scheduling resource time granularity of a first network and a scheduling resource time granularity of a second network may be referred to as a TTI. For example, a TTI of the first network is greater than a TTI of the second network, and the TTI of the first network is twice the TTI of the second network. Frequency-division multiplexing is performed on a channel, mapped onto a first resource that is on the first network and that is used to send control information of the second network, and a PDSCH of the first network. One TTI of the first network (the TTI of the first network is referred to as a TTIA herein) includes two first resources that are referred to as an RA1 and an RA2 respectively herein. A length of each first resource in a time domain is equal to the TTI of the second network, and the TTI of the second network is referred to as a TTIB herein. The figure shows two TTIs of the second network, namely, a TTIB1 and a TTIB2. Certainly, lengths of the RA1 and the RA2 may also be different. This is not limited herein. The base station 200 instructs, by using the first network, the terminal 300 to receive downlink data in the TTIB1 and the TTIB2 of the second network. In this case, downlink control information sent on the first resource is downlink grant information.

As shown in FIG. 5(*a*), the base station 200 sends, on the RA1, downlink grant information that is used to schedule the TTIB1, and sends, on the RA2, downlink grant information that is used to schedule the TTIB2, and then, the base station 200 sends, by using the first network, the downlink grant information corresponding to the TTIB1 and the downlink grant information corresponding to the TTIB2 to the terminal 300.

Alternatively, as shown in FIG. 5(*b*), the base station 200 sends, on the RA1, downlink grant information that is used to schedule the TTIB2, and the base station 200 sends, by using the first network, the downlink grant information corresponding to the TTIB2 to the terminal 300. In this case, in the time domain, only that the downlink grant information is sent before or at the same time as the TTI of the second network needs to be ensured, where the TTI of the second network is scheduled by using the downlink grant information. Certainly, the base station 200 may send, on the RA1, the downlink grant information that is used to schedule the TTIB2, and may further send, on the RA1, downlink grant information that is used to schedule the TTIB1, and then, the base station 200 sends, by using the first network, the downlink grant information that is used to schedule the TTIB1 and the downlink grant information that is used to schedule the TTIB2 to the terminal 300.

Alternatively, as shown in FIG. 5(*c*), on a basis of maintaining a correspondence that the TTI of the first network is twice the TTI of the second network, four consecutive TTIs of the second network are obtained by extension and are displayed in the time domain, namely, the TTIB1, the TTIB2, a TTIB3, and a TTIB4. In this case, the base station 200 sends, on the RA2, downlink grant information that is used to schedule the TTIB3. Certainly, the base station 200 may further send, on the RA2, downlink grant information that is used to schedule the TTIB4, that is, in the time domain, the downlink grant information and the scheduled TTI of the second network may be separated by one or more TTIs of the second network, only provided that the downlink grant information is sent before or at the same time as the scheduled TTI the second network.

Figure 6:
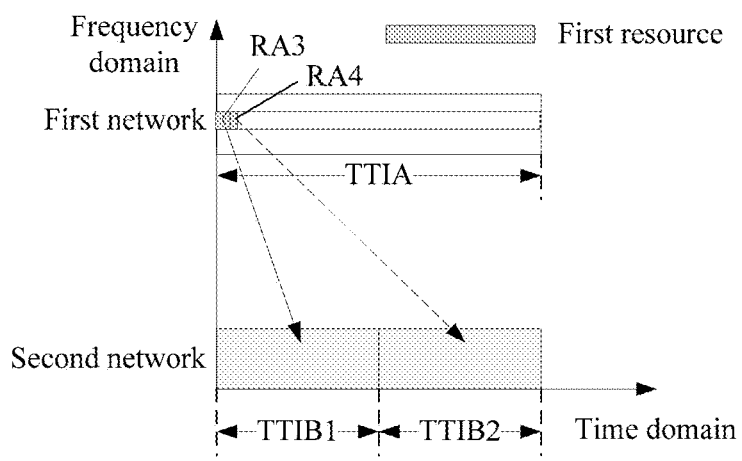
FIG. 6 is a schematic diagram of yet another type of resource scheduling according to an embodiment of the present application.

When other conditions of the scenario in FIG. 5 keep unchanged, if a resource that is on the first network and that is used to send the control information of the second network is mapped onto a PDCCH of the first network, a resource scheduling manner may be shown in FIG. 6. In FIG. 6, there may be two first resources in the PDCCH, which are respectively referred to as an RA3 and an RA4 herein. The downlink grant information used to schedule the TTIB1 is sent on the RA3, and the downlink grant information used to schedule the TTIB2 is sent on RA4. The PDSCH of the first network may still be used to transmit data information of the first network.

It should be noted that the scheduling resource time granularity of the first network and the scheduling resource time granularity of the second network may be in a non-integer multiple correspondence, or the scheduling resource time granularity of the first network may be less than the scheduling resource time granularity of the second network. This does not affect implementation of the present application.

In addition, the first resource on the first network can be used by the base station 200 to send the downlink control information of the second network to the terminal 300, and can further be used by the base station 200 to send downlink control information of the first network to the terminal 300. There is no strict execution sequence for the steps, and both the steps may be performed in an implementation process of the present application.

In this way, the base station 200 can send the downlink control information of the first network and the second network to the terminal 300 by using the first resource, so that resource utilization is improved.

Alternatively, the first resource can further be used by the base station 200 to send downlink control information to another terminal that can receive a service from the first network. In this way, the resource utilization can also be improved.

It should be noted that, in this embodiment of the present application, when one resource scheduling time granularity of the first network includes a plurality of first resources, the plurality of first resources may be consecutive or may be inconsecutive in the time domain.

In addition, in the embodiments described in FIG. 5 and FIG. 6, first resources with a same frequency-domain location and different time-domain locations are grouped into a first resource set. Similarly, first resources with a same time-domain location and different frequency-domain locations can also be grouped into a first resource set and can also achieve the objectives of the present application. No limitation is imposed herein.

Optionally, a transceiver unit 220 of the base station 200 is configured to send the downlink control information of the second network to the terminal 300 on the first resource.

The downlink control information sent on the first resource is used to schedule a resource in a first scheduling resource time granularity of the second network, and a length of the scheduling resource time granularity of the first network is different from a length of the scheduling resource time granularity of the second network.

A transceiver unit 310 of the terminal 300 is configured to receive the downlink control information of the second network that is sent to the terminal 300 by the base station 200 on the first resource.

According to the technical solution provided in this embodiment of the present application, the base station determines a resource on the first network, and sends the downlink control information of the second network on the resource, so that scheduling is implemented across two networks with different scheduling resource time granularities. Therefore, control information can be transmitted when the second network encounters a problem such as overload or low reliability of communication, thereby ensuring that the control information of the second network can be accurately transmitted to user equipment.

In order that the terminal 300 can learn of a specific location of the first resource set on the first network, so that the terminal 300 can receive the downlink control information of the second network at the location in a timely manner, before the base station 200 sends the downlink control information of the second network to the terminal 300 on the first resource, the method may further include the following step:

sending, by the base station 200, configuration information to the terminal 300, where the configuration information is used to indicate the location of the first resource set to the terminal 300.

Optionally, the configuration information includes at least one of time-domain location indication information of the resource or frequency-domain location indication information of the resource.

Figure 7:
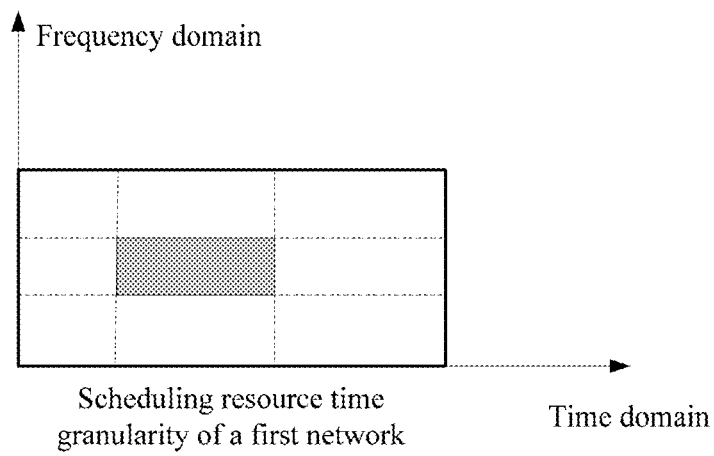
FIG. 7 is a schematic diagram of a scheduling resource time granularity of a first network according to an embodiment of the present application.

The time-domain location indication information of the resource may be specifically a quantity and locations of symbols that are used by the base station 200 to transmit the control information of the second network in the scheduling resource time granularity of the first network. The frequency-domain location indication information of the resource may be specifically a quantity and locations of subcarriers that are used by the base station 200 to transmit the control information of the second network in the scheduling resource time granularity of the first network. As shown in FIG. 7, FIG. 7 is one scheduling resource time granularity of the first network. The scheduling resource time granularity may be described from a time-domain perspective or a frequency-domain perspective. A grey part in the figure may be a first resource set that is used to transmit the control information of the second network. The entire location of the resource can be indicated by the time-domain location indication information of the resource, the frequency-domain location indication information of the resource, or the time-domain location indication information of the resource and the frequency-domain location indication information of the resource.

Certainly, the time-domain location indication information or the frequency-domain location indication information may specifically indicate, in a form of a bit map to the terminal 300, which symbols or which subcarriers are grouped into the first resource set. For example, if a bit in the bit map is "1", the "1" represents a symbol corresponding to the bit, or represents that a carrier belongs to the first resource set, or the like.

The configuration information is specifically sent in the following manner: when the base station 200 controls the first network and the second network, the base station 200 may send the configuration information of the resource to the terminal 300 by using the first network, or the base station 200 may send the configuration information of the resource to the terminal 300 by using the second network; when the base station 200 can control only the first network, the base station 200 may send the configuration information of the resource to the terminal 300 by using the first network, or the base station 200 may communicate with a base station (for example, the second base station in FIG. 1(b)) controlling the second network and send the configuration information of the resource to the base station controlling the second network, and then, the base station controlling the second network sends the configuration information to the terminal 300.

Further, the base station 200 may send, by using the first network or the second network, the configuration information to the terminal 300 by using a control channel, broadcast signaling, or radio resource control (RRC) signaling.

A specific implementation may be as follows:

(1) By using the control channel

When accessing the first network or the second network, the terminal 300 is allocated a radio network temporary identifier (RNTI).

The base station 200 notifies the terminal 300 of the configuration information by using a control channel of the first network or the second network. The configuration information may be carried in downlink control information (DCI).

The terminal 300 demodulates the DCI by using the allocated RNTI, to obtain the configuration information.

(2) By using the broadcast signaling

The base station 200 may send the configuration information of the resource to the terminal 300 by using broadcast signaling of the first network or the second network. The broadcast signaling may be sent periodically, so as to update the configuration information of the resource in a timely manner.

(3) By using the RRC signaling

The base station 200 may send the configuration information of the resource to the terminal 300 by using RRC signaling of the first network or the second network.

Optionally, the transceiver unit 220 of the base station 200 is configured to send the configuration information to the terminal 300.

Optionally, the transceiver unit 310 of the terminal 300 is configured to receive the configuration information sent by the base station 200.

That the terminal 300 receives the configuration information sent by the base station 200 is actually an implementation of determining the location of the first resource on the first network by the terminal 300.

That the base station 200 sends the configuration information to the terminal 300 is an optional method step. Therefore, if the step is not performed, the terminal 300 can also determine the location of the first resource on the first network by means of preset protocol configuration, or the like.

Optionally, when the downlink control information in S402 is the downlink grant information, after the terminal 300 receives the downlink control information of the second network that is sent to the terminal 300 by the base station 200 on the first resource, the method may further include:

receiving, by the terminal 300, the downlink data of the second network according to a location that is of downlink data of the second network and that is indicated by the downlink grant information, where the downlink data of the second network is scheduled by using the downlink grant information, and the downlink data is in the first scheduling resource time granularity of the second network.

Optionally, when the downlink control information in S402 is the uplink grant information, after the terminal 300 receives the downlink control information of the second network that is sent to the terminal 300 by the base station 200 on the first resource, the method may further include:

sending, by the terminal 300 according to a location on which uplink data is to be sent and that is indicated by the uplink grant information, the uplink data to the first scheduling resource time granularity of the second network, where the first scheduling resource time granularity of the second network is scheduled by using the uplink grant information.

Optionally, when the downlink control information in S402 is the downlink ACK, after the terminal 300 receives the downlink control information of the second network that is sent to the terminal 300 by the base station 200 on the first resource, the method may further include:

determining, by the terminal 300 according to the downlink ACK, that to-be-responded uplink data that is in a scheduling resource time granularity of the second network and that is scheduled by using the downlink ACK is properly received.

Optionally, when the downlink control information in S402 is the downlink NACK, after the terminal 300 receives the downlink control information of the second network that is sent to the terminal 300 by the base station 200 on the first resource, the method may further include:

determining, by the terminal 300 according to the downlink NACK, that to-be-responded uplink data that is in a scheduling resource time granularity of the second network and that is scheduled by using the downlink NACK is not properly received. Further, the terminal 300 may choose to retransmit data in the scheduling resource time granularity of the second network, or when a quantity of retransmission times has already reached a preset maximum quantity of transmission times, the terminal 300 determines to cancel retransmission of data in the scheduling resource time granularity of the second network.

Optionally, the transceiver unit 310 of the terminal 300 is configured to receive the downlink data of the second network, where the downlink data of the second network is scheduled by using the downlink grant information, and the downlink data is in the scheduling resource time granularity of the second network.

Optionally, the transceiver unit 310 of the terminal 300 is configured to send the uplink data to the first scheduling resource time granularity of the second network, where the first scheduling resource time granularity of the second network is scheduled by using the uplink grant information.

Optionally, a processing unit 320 of the terminal 300 is configured to determine, according to the downlink ACK, that the to-be-responded uplink data that is in the scheduling resource time granularity of the second network and that is scheduled by using the downlink ACK is properly received.

Optionally, the processing unit 320 of the terminal 300 is configured to determine, according to the downlink NACK, that the to-be-responded uplink data that is in the scheduling resource time granularity of the second network and that is scheduled by using the downlink NACK is not properly received.

Compared with the base station 200 that sends the downlink control information of the second network to the terminal 300 on the first resource on the first network, the terminal 300 can also send uplink control information of the second network to the base station 200 on the first network in a similar manner.

Optionally, the technical solution provided in this embodiment of the present application may further include the following steps:

determining, by the base station 200, a second resource in the first network, where the second resource is located in a second scheduling resource time granularity of the first network; and sending, by the terminal 300, the uplink control information of the second network to the base station 200 on the second resource, where the uplink control information sent on the second resource is used to indicate information about a resource in a second scheduling resource time granularity of the second network.

The uplink control information includes: identifier information of the terminal (used to make the base station 200 know which terminal the control information belongs to), uplink ACK information, uplink NACK information, or channel state information (CSI).

When the terminal 300 sends the uplink control information, a manner of allocating the second resource is corresponding to a manner of allocating the first resource, and details are not described herein again.

In addition, in this embodiment of the present application, the second resource may be partially overlapped or entirely overlapped with the first resource; or the first scheduling resource time granularity of the first network may be the second scheduling resource time granularity of the first network. This is not limited herein.

If the base station 200 is the first base station that can provide a service only for the first network, after receiving the uplink control information, the base station 200 may forward the uplink control information to the second base station on the second network.

Optionally, the processing unit 210 of the base station 200 is configured to determine the second resource on the first network, where the second resource is located in the second scheduling resource time granularity of the first network.

Optionally, the transceiver unit 310 of the terminal 300 is configured to send the uplink control information of the second network to the base station 200 on the second resource.

The uplink control information sent on the second resource is used to indicate the information about the resource in the second scheduling resource time granularity of the second network.

The terminal 300 sends the uplink control information of the second network on the second resource, so that scheduling is implemented across two networks with different scheduling resource time granularities. Therefore, control information can be transmitted when the second network encounters a problem such as overload or low reliability of communication, thereby ensuring that the control information of the second network can be accurately transmitted to user equipment.

Figure 8:
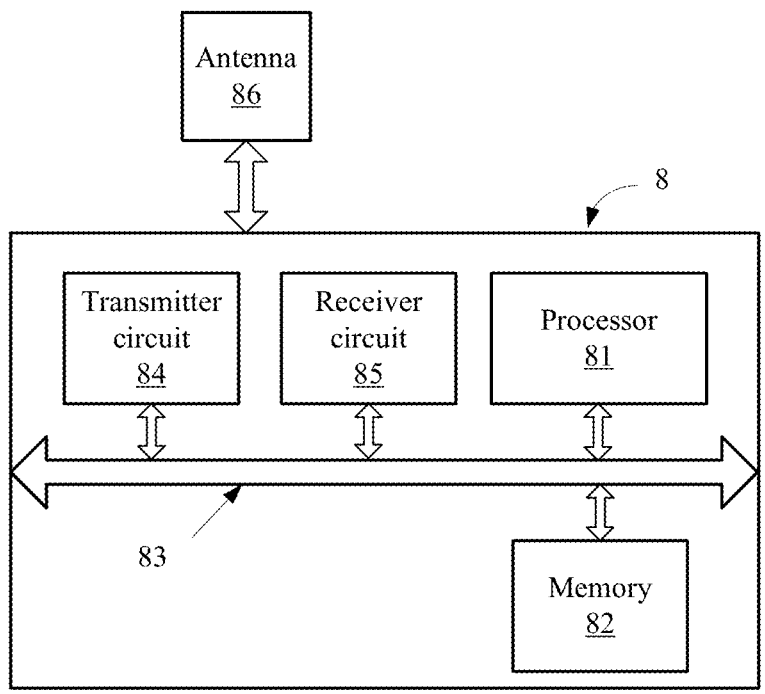
FIG. 8 is a schematic diagram of a communications apparatus according to an embodiment of the present application.

As shown in FIG. 8, an embodiment of the present application provides a communications apparatus 8, including a processor 81 and a memory 82. The processor 81 and the memory 82 are connected by using a bus 83. The communications apparatus 8 may be the base station 200 in the foregoing embodiments of the present application, or may be the terminal 300 in the foregoing embodiments of the present application.

When the communications apparatus 8 is the base station 200, the memory 82 is configured to store instructions of all methods executed by the base station 200 in the embodiment of the present application in FIG. 4, to make the processor 81 execute the methods.

When the communications apparatus 8 is the terminal 300, the memory 82 is configured to store all methods executed by the terminal 300 in the embodiment of the present application in FIG. 4, to make the processor 81 execute the methods.

In addition, the communications apparatus 8 may further include a transmitter circuit 84, a receiver circuit 85, an antenna 86, and the like. The processor 81 controls an operation of the communications apparatus 8. The processor 81 may also be referred to as a CPU (central processing unit). The memory 82 may include a read-only memory and a random access memory, and provides an instruction and data for the processor 81. A part of the memory 82 may further include a non-volatile random access memory (NVRAM). In a specific application, the transmitter circuit 84 and the receiver circuit 85 may be coupled to the antenna 86. All components of the communications apparatus 8 are coupled together by using the bus 83, where the bus 83 includes not only a data bus but also a power supply bus, a control bus, a state signal bus, and the like. However, for clear description, various buses are represented by the bus 83 in the figure.

The method disclosed in the foregoing embodiments of the present application may be applied to the processor 81, or implemented by the processor 81. The processor 81 may be an integrated circuit chip with a signal processing capability. In an implementation process, the steps of the foregoing method may be implemented by using an integrated logical circuit of hardware in the processor 81, or by using an instruction in a software manner. The foregoing processor 81 may be a general purpose processor, a digital signal processor (DSP), an application-specific integrated circuit (ASIC), a field programmable gate array (FPGA) or another programmable logic device, a discrete gate or a transistor logic device, or a discrete hardware component.

Persons skilled in the art may further understand that various illustrative logical blocks and steps that are listed in the embodiments of the present application may be implemented by using electronic hardware, computer software, or a combination thereof. In order to clearly display the interchangeability between the hardware and the software, functions of the foregoing various illustrative components and steps have been generally described. Whether the functions are implemented by using hardware or software depends on particular applications and a design requirement of the entire system. Persons skilled in the art may use different methods to implement the functions for each particular application, but it should not be considered that the implementation goes beyond the protection scope of the embodiments of the present application.

The various illustrative logical blocks, modules, and circuits described in the embodiments of the present application may implement or operate the described functions by using a general processing unit, a digital signal processing unit, an application-specific integrated circuit (ASIC), a field programmable gate array (FPGA) or another programmable logical apparatus, a discrete gate or transistor logic, a discrete hardware component, or a design of any combination thereof. The general processing unit may be a microprocessing unit. Optionally, the general processing unit may be any conventional processing unit, controller, microcontroller, or state machine. The processing unit may also be implemented by a combination of computing apparatuses, such as a digital signal processing unit and a microprocessing unit, multiple microprocessing units, one or more microprocessing units with a digital signal processing unit core, or any other similar configuration.

Steps of the methods or algorithms described in the embodiments of the present application may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processing unit so that the processing unit may read information from the storage medium and write information to the storage medium. Optionally, the storage medium may be further integrated into a processing unit. The processing unit and the storage medium may be configured in an ASIC, and the ASIC may be configured in a user terminal. Optionally, the processing unit and the storage medium may also be configured in different components of the user terminal.

In one or more examples of designs, the foregoing functions described in the embodiments of the present application may be implemented by using hardware, software, firmware, or any combination thereof. If the present application is implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in another form that can be read by a general or special computer or a general or special processing unit. In addition, any connection may be appropriately defined as a computer-readable medium. For example, if software is transmitted from a website, a server, or another remote resource by using a coaxial cable, an optical fiber, a twisted pair, a digital subscriber line (DSL) or in a wireless manner such as infrared, radio, or microwave, the software is also included in a defined computer-readable medium. The disc and the disk include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

According to the foregoing description of this specification in the present application, a person skilled in the art may use or implement the content of the present application. Any modification based on the disclosed content shall be considered obvious in the art. The basic principles described in the present application may be applied to other variations without departing from the essence and scope of the present application. Therefore, the content disclosed in the present application is not limited to the described embodiments and designs but may also be extended to a maximum scope that is consistent with the principles and disclosed new features of the present application.

What is claimed is:

1. A control information sending method, wherein the method comprises:
    determining, by a base station, a first resource in a first resource set, wherein the first resource set comprises a plurality of first resources and is located in a scheduling resource time granularity of the first network;
    sending, by the base station, configuration information to a terminal, wherein the configuration information indicates a location of the first resource set to the terminal; and
    sending, by the base station, downlink control information regarding a second network to the terminal on the first resource, wherein
    the downlink control information sent on the first resource is used to schedule a resource in a scheduling resource time granularity of the second network, and a length of the scheduling resource time granularity of the first network is different from a length of the scheduling resource time granularity of the second network.

2. The method according to claim 1, wherein
    the configuration information comprises one or both of time-domain location indication information of the first resource set and frequency-domain location indication information of the first resource set.

3. The method according to claim 1, wherein the length of the scheduling resource time granularity of the first network is N times the length of the scheduling resource time granularity of the second network, and the scheduling resource time granularity of the first network comprises N first resources, wherein N is a positive integer greater than 1.

4. A base station, wherein the base station comprises:
a memory storing instructions;
a transceiver; and
a processor coupled to the memory to execute the instructions to:
determine a first resource in a first resource set, wherein the first resource set comprises a plurality of first resources and is located in a scheduling resource time granularity of the first network;
utilize the transceiver to send configuration information indicating a location of the first resource set and downlink control information regarding a second network to a terminal, wherein the downlink control information is on the first resource, and
the downlink control information sent on the first resource is used to schedule a resource in a scheduling resource time granularity of the second network, and a length of the scheduling resource time granularity of the first network is different from a length of the scheduling resource time granularity of the second network.

5. The base station according to claim 4, wherein the configuration information comprises one or both of time-domain location indication information of the first resource set and frequency-domain location indication information of the first resource set.

6. The base station according to claim 4, wherein the length of the scheduling resource time granularity of the first network is N times the length of the scheduling resource time granularity of the second network, and the scheduling resource time granularity of the first network comprises N first resources, wherein N is a positive integer greater than 1.

7. A control information receiving method, wherein the method comprises:
receiving, by a terminal, configuration information sent by a base station, wherein the configuration information indicates a location of a first resource set located in a scheduling resource time granularity of a first network to the terminal, wherein the first resource set comprises a plurality of first resources;
determining, by the terminal, a location of a first resource comprised in the first resource set; and
receiving, by the terminal, downlink control information regarding a second network that is sent to the terminal by a base station on the first resource, wherein
the downlink control information sent on the first resource is used to schedule a resource in a scheduling resource time granularity of the second network, and a length of the scheduling resource time granularity of the first network is different from a length of the scheduling resource time granularity of the second network.

8. The method according to claim 7, wherein
the configuration information comprises one or both of time-domain location indication information of the first resource set and frequency-domain location indication information of the first resource set.

9. The method according to claim 7, wherein the length of the scheduling resource time granularity of the first network is N times the length of the scheduling resource time granularity of the second network, and the scheduling resource time granularity of the first network comprises N first resources, wherein N is a positive integer greater than 1.

10. A device, wherein the device comprises:
a memory storing instructions; and
a processor coupled to the memory to execute the instructions to:
receive, through a transceiver, configuration information sent by a base station, wherein the configuration information indicates a location of a first resource set located in a scheduling resource time granularity of a first network to the terminal, wherein the first resource set comprises a plurality of first resources;
determine a location of a first resource comprised in the first resource set; and
receive, through the transceiver, downlink control information regarding a second network that is sent to the terminal by a base station on the first resource, wherein
the downlink control information sent on the first resource is used to schedule a resource in a scheduling resource time granularity of the second network, and a length of the scheduling resource time granularity of the first network is different from a length of the scheduling resource time granularity of the second network.

11. The device according to claim 10, wherein the configuration information comprises one or both of time-domain location indication information of the first resource set and frequency-domain location indication information of the first resource set.

12. The device according to claim 10, wherein the length of the scheduling resource time granularity of the first network is N times the length of the scheduling resource time granularity of the second network, and the scheduling resource time granularity of the first network comprises N first resources, wherein N is a positive integer greater than 1.

* * * * *